(12) United States Patent
Cohen

(10) Patent No.: US 9,369,051 B2
(45) Date of Patent: Jun. 14, 2016

(54) INTERLEAVED FORWARD CONVERTER WITH WIDE INPUT AND OUTPUT DYNAMIC RANGE

(71) Applicant: Texas Instruments Incorporated, Dallas, TX (US)

(72) Inventor: Isaac Cohen, Dix Hills, NY (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 177 days.

(21) Appl. No.: 14/044,516

(22) Filed: Oct. 2, 2013

(65) Prior Publication Data

US 2015/0092454 A1    Apr. 2, 2015

(51) Int. Cl.
*H02M 3/335* (2006.01)
*H02M 3/28* (2006.01)

(52) U.S. Cl.
CPC .......... *H02M 3/33546* (2013.01); *H02M 3/285* (2013.01); *H02M 3/33538* (2013.01); *H02M 3/33569* (2013.01)

(58) Field of Classification Search
CPC .......... H02M 3/3353; H02M 3/33538; H02M 3/33546; H02M 3/33553; H02M 3/33569; H02M 3/285; H02M 2001/0077; H02M 2001/0067

See application file for complete search history.

(56) References Cited

U.S. PATENT DOCUMENTS 5,508,903 A * 4/1996 Alexndrov ................ 363/16
2003/0185026 A1* 10/2003 Matsuda et al. ............ 363/71

FOREIGN PATENT DOCUMENTS

| CN | 10557172 A | 10/2009 |
|---|---|---|
| SU | SU1737667 A1 | 5/1992 |
| TW | 201338386 A | 6/2013 |

OTHER PUBLICATIONS

PCT Search Report mailed Sep. 29, 2014 (7 pp.) PCT/US2014/057998.
TW201338386A, English Machine Translation of Abstract (3 pp.).
SU1737667A1, English Machine Translation (8 pp.).
CN10557172A, English Machine Translation (7 pp.).

* cited by examiner

*Primary Examiner* — Harry Behm
(74) *Attorney, Agent, or Firm* — William B. Kempler; Frank D. Cimino

(57) ABSTRACT

An interleaved forward voltage converter having a first inverter stage has a first transformer having a first secondary winding coupled to a filter inductor. A second converter stage has a second transformer having a second secondary winding coupled to the filter inductor. A diode is coupled between the first and second secondary windings to automatically connect the first and second secondary windings in series when a duty cycle of the converter exceeds 50%. An interleaved forward voltage converter can connect the two primary windings in either parallel or a series configuration. The two secondary windings can be connected in either parallel or a series configuration. Having the two primary windings in parallel and the two secondary windings in series allows the converter to operate with a lower input voltage. Having the two primary windings in series and the two secondary windings in a parallel configuration allows the converter to operate with a higher input voltage.

9 Claims, 8 Drawing Sheets

INTERLEAVED FORWARD CONVERTER WITH WIDE INPUT AND OUTPUT DYNAMIC RANGE

FIELD OF THE INVENTION

The invention relates to an interleaved forward voltage converter and specifically to a converter having a wide input and output dynamic range.

BACKGROUND OF THE INVENTION

Interleaved forward voltage converters, also known as push-push converters, are known in the art. FIG. 1 shows an example of a prior art interleaved forward voltage converter, shown generally as 100. In the converter 100, a source of input voltage Vin is coupled to a positive terminal of a first transformer T1 of the first converter stage. The other terminal of transformer T1 is connected to ground through a first switching transistor Q1. The transistor Q1 is driven by a pulse generator 102. A secondary winding of a transformer T1 has a negative terminal connected to ground the positive terminal connected to one terminal of a filter inductor Lf through diode Df1. A second converter stage comprising transformer T2 has a positive terminal of the primary winding connected to the source of voltage and a second negative terminal connected to ground through transistor Q2. The gate of transistor Q2 is driven by pulse generator 106. The secondary winding of transformer T2 has a negative terminal connected to ground and a positive terminal connected to the input terminal of filter inductor Lf through diode Df2. The diode Df1 and Df2 are connected at node Vfilt. A freewheeling diode Dfw is connected to this node and a load, here shown as a resistor R1, is connected to the terminal on the other side of inductor Lf. An output capacitor Co is coupled across the load resistor R1.

Transistors Q1 and Q2 are switched 180° out of phase from each other and output voltage regulation is by way of pulse width modulation (PWM) of the gate drive signals (not shown). Operation of the circuit shown in FIG. 1 will now be explained in connection with FIG. 2 where the duty cycle of transistors Q1 and Q2 is 30%. In FIG. 2, the waveforms for operation of the circuit at 30% duty cycle are shown generally as 200. The currents through transistors Q1 and Q2 are shown by the waveforms I(Q1) and I(Q2). The current through the freewheeling diode Dfw is shown by the waveform I (Dfw). The voltage at the node Vfilt is shown as Vfilt and the output voltage is shown as Vout. The voltage at Vout is shown on an expanded voltage scale so that the ripple can be seen. At this duty cycle, the voltages generated by the first converter and the second converter add at the terminal Dfilt and an increased voltage is available at the terminal Vout.

Operation of the circuit shown in FIG. 1 will now be explained in connection with FIG. 3 where the duty cycle of transistors Q1 and Q2 is 70%. The same waveforms are shown in FIG. 3 as were shown in FIG. 2, generally as 300. We see that although the duty cycles of the two transistors cause them to overlap in their ON time, the current through the transistors to not overlap, and no additional voltage is generated at the node Vfilt during the period of overlap. The current through the freewheeling diode and the voltage at both the node Vfilt and Vout are pure DC.

The output voltage for this conventional interleaved forward voltage converter is:

$$V\text{out} = (V\text{in}/N) \cdot 2 \cdot D \text{ for } D \text{ less than } 0.5 \qquad \text{(equation 1)}$$

$$V\text{out} = (V\text{in}/N) \text{ for } D \text{ greater than } 0.5 \qquad \text{(equation 2)}$$

Where
Vin is the input voltage
Vout is the output voltage
N is the turns ratio of the transformers and
D is the duty cycle for the transistors Q1 and Q2
Thus, once the duty cycle exceeds 50%, there can be no increase in the output voltage.

Therefore, there is a need for a voltage converter having greater flexibility for generating an output voltage.

SUMMARY OF THE INVENTION

It is a general object of the invention to provide an interleaved forward voltage converter having a greater flexibility in generating an output voltage.

This and other and other objects of the invention are provided by an interleaved forward voltage converter comprising a first inverter stage comprising a first transformer having a turns ratio N1 having a primary winding and having one terminal coupled to a source of input voltage and another terminal coupled to a first switching transistor. A first secondary winding for the first transformer has a first terminal coupled to a first terminal of a filter inductor and a second terminal coupled to a first diode. A second converter stage comprising a second transformer has a turns ratio N2 and has a primary winding having one terminal coupled to the source of input voltage and another terminal coupled to a second switching transistor. A second secondary winding for the second transformer has a first terminal is coupled to the first terminal of the filter inductor through a second diode and a second terminal coupled to a reference voltage source. A third diode is coupled between the first terminal of the second secondary winding for the second transformer and the second terminal of the first secondary winding of the first transformer.

An aspect of the invention comprises an interleaved forward voltage converter comprising a first converter stage comprising a first transformer having a turn ratio N1 and having a primary winding having one terminal coupled to a source of input voltage and another terminal coupled to a first switching transistor and a second switching transistor. A first secondary winding for the first transformer has a first terminal coupled to a first terminal of a filter inductor and a second terminal coupled to a first diode and a third switching transistor. A second converter stage comprises a second transformer having a turns ratio N2 and has a primary winding having one terminal coupled to the source of input voltage and another terminal coupled to a reference voltage source. A second secondary winding for the second transformer has a first terminal coupled to the first terminal of the filter inductor to a second diode and a second terminal coupled to the reference voltage source. The third transistor is coupled between the second terminal of the first secondary winding of the first transformer and the first terminal of the second secondary winding of the second transformer.

Another aspect of the invention includes an interleaved forward voltage converter comprising a first inverter stage having a first transformer that has a first secondary winding coupled to a filter inductor. A second converter stage has a second transformer having a second secondary winding coupled to the filter inductor. A diode is coupled between the first and second secondary windings to automatically connect the first and second secondary windings in series when a duty cycle of the converter exceeds 50%.

A further aspect of the invention is provided by a method of operating an interleaved forward voltage converter so as to provide a series or parallel connection between the converters comprising providing to transformers each having a primary winding having a positive terminal coupled to a source of voltage and each having a secondary winding having a positive terminal coupled to one terminal of a filter inductor.

Parallel operation of the primary windings is alternatively provided by driving a first pair of transistors 180° out of phase with each other, one transistor being in series with a positive terminal of a first primary winding and other transistor being in series with the negative terminal of a second primary winding. Series operation of the primary windings is alternatively provided by driving a third transistor coupled between a negative terminal of the first primary winding and the positive terminal of the second primary winding. Parallel operation of the secondary windings is provided by coupling a negative terminal of the first secondary winding to a reference potential through a first diode and coupling a positive terminal of the second secondary winding to the first terminal of the filter inductor through a second diode. Series operation of the secondary windings is alternatively provided by driving a fourth transistor between a negative terminal of the first secondary winding in the positive terminal of the second secondary winding.

BRIEF DESCRIPTION OF DRAWINGS

Further aspects of the invention will appear from the appending claims and from the following detailed description given with reference to the appending drawings.

DETAILED DESCRIPTION OF EXAMPLE EMBODIMENTS

Figure 4:
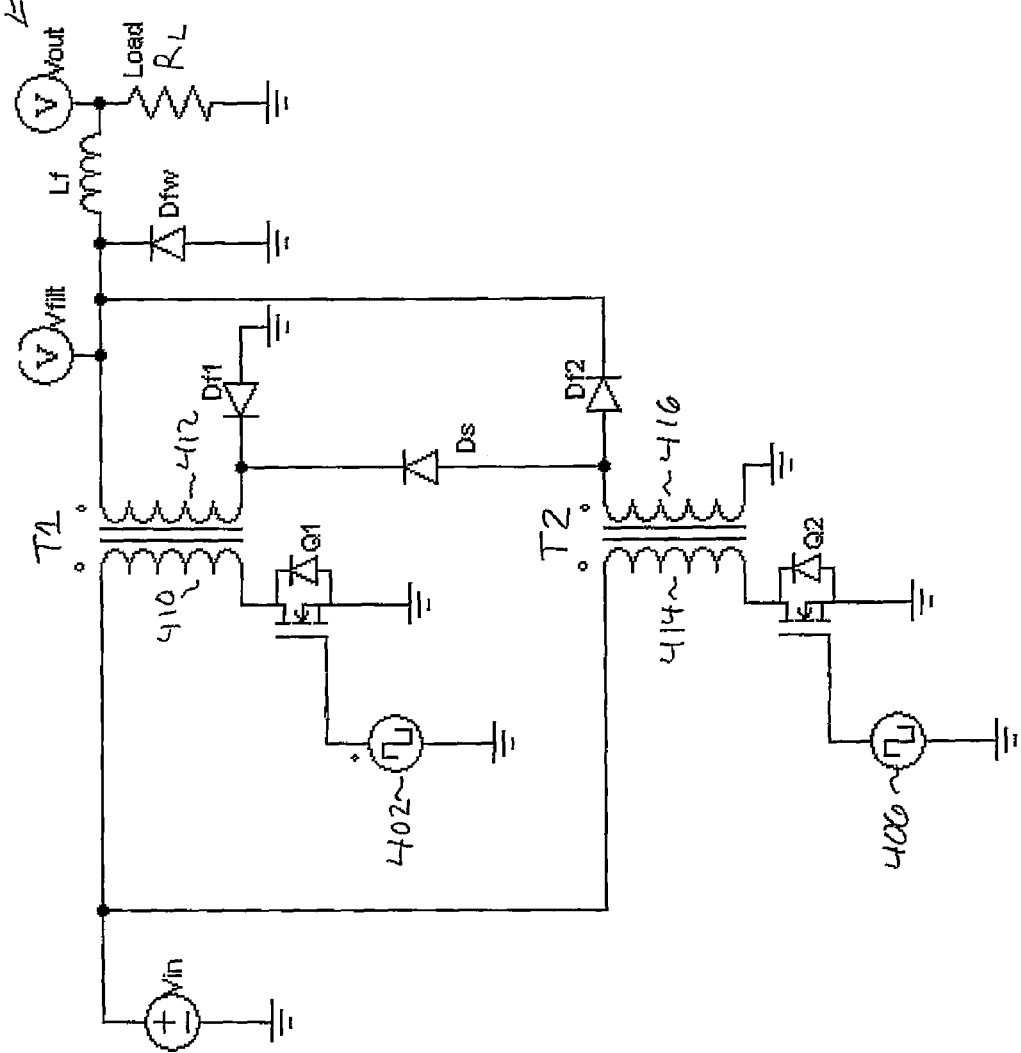
FIG. 4 is a schematic diagram of an interleaved forward voltage converter of the present invention.

FIG. 4 is a schematic diagram of a first aspect of the present invention, shown generally as 400. In FIG. 4, a first converter comprises a first transformer T1 having a positive terminal of the primary winding 410 coupled to a source of input voltage Vin. The negative terminal of the primary winding 410 of transformer T1 is coupled to ground through transistor Q1. The gate of transistor Q1 is coupled to pulse generator 402. The secondary winding 412 of transformer T1 has its positive terminal connected to a first terminal of filter inductor at node Vfilt. The negative terminal of secondary winding 412 is connected to ground through diode Df1. A second converter comprises transformer T2 having a positive terminal of primary winding 414 connected to the source of input voltage Vin. The negative terminal of primary winding 414 is coupled to ground through transistor Q2. The gate of transistor Q2 is coupled to pulse generator 406. The secondary winding of transformer T2 has its positive terminal connected to the node Vfilt through diode Df2. A freewheeling diode Dfw is coupled from the node Vfilt to ground and a load, here shown as resistor RL, is coupled from the second terminal of the filter inductor Lf to ground. A third diode DS connects the positive terminal of the secondary winding 416 the transformer T2 to the negative terminal of secondary winding 412 of transformer T1.

Figure 5:
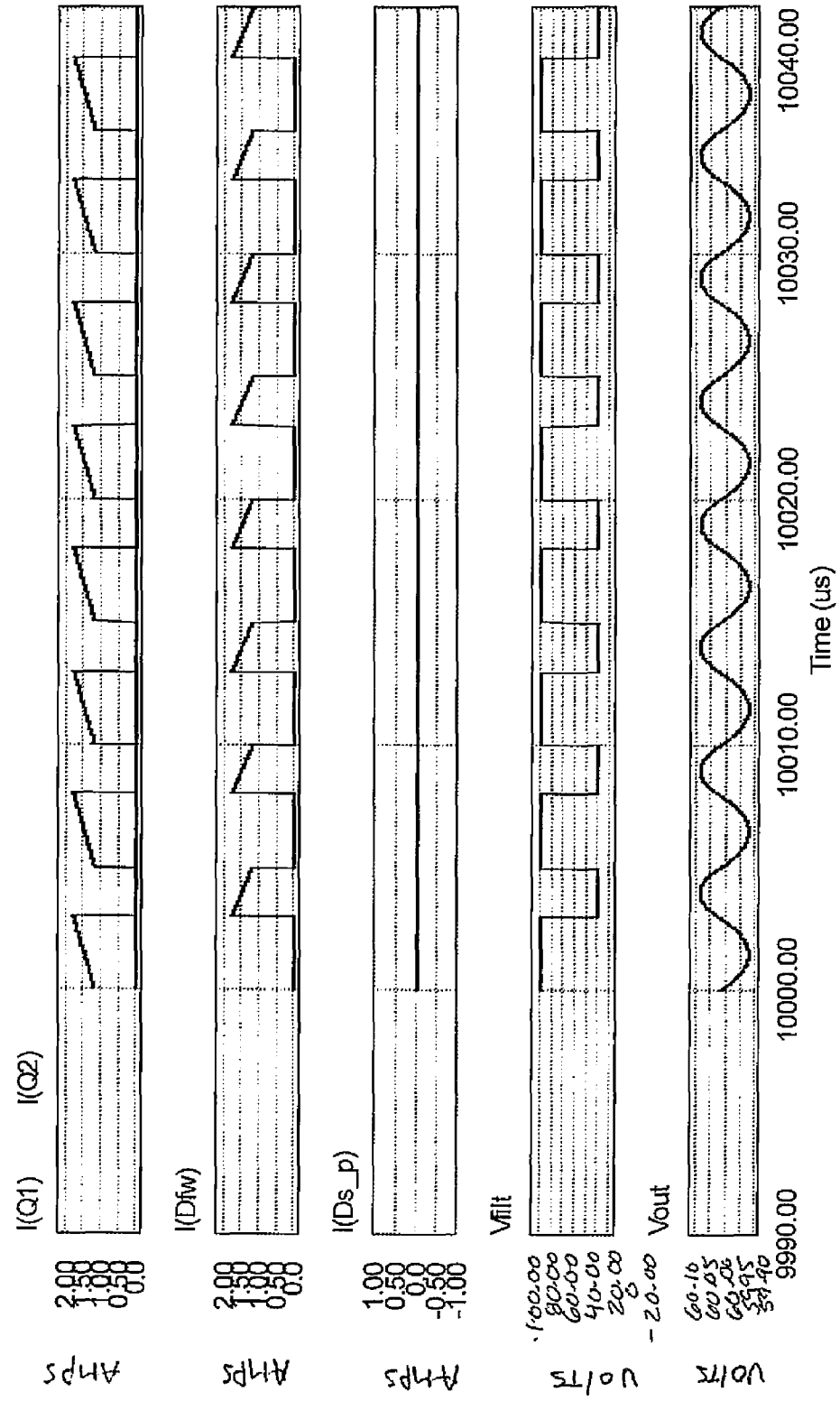
FIG. 5 is a representation of the waveforms of the circuit shown in FIG. 4 at a 30% duty cycle.
Figure 6:
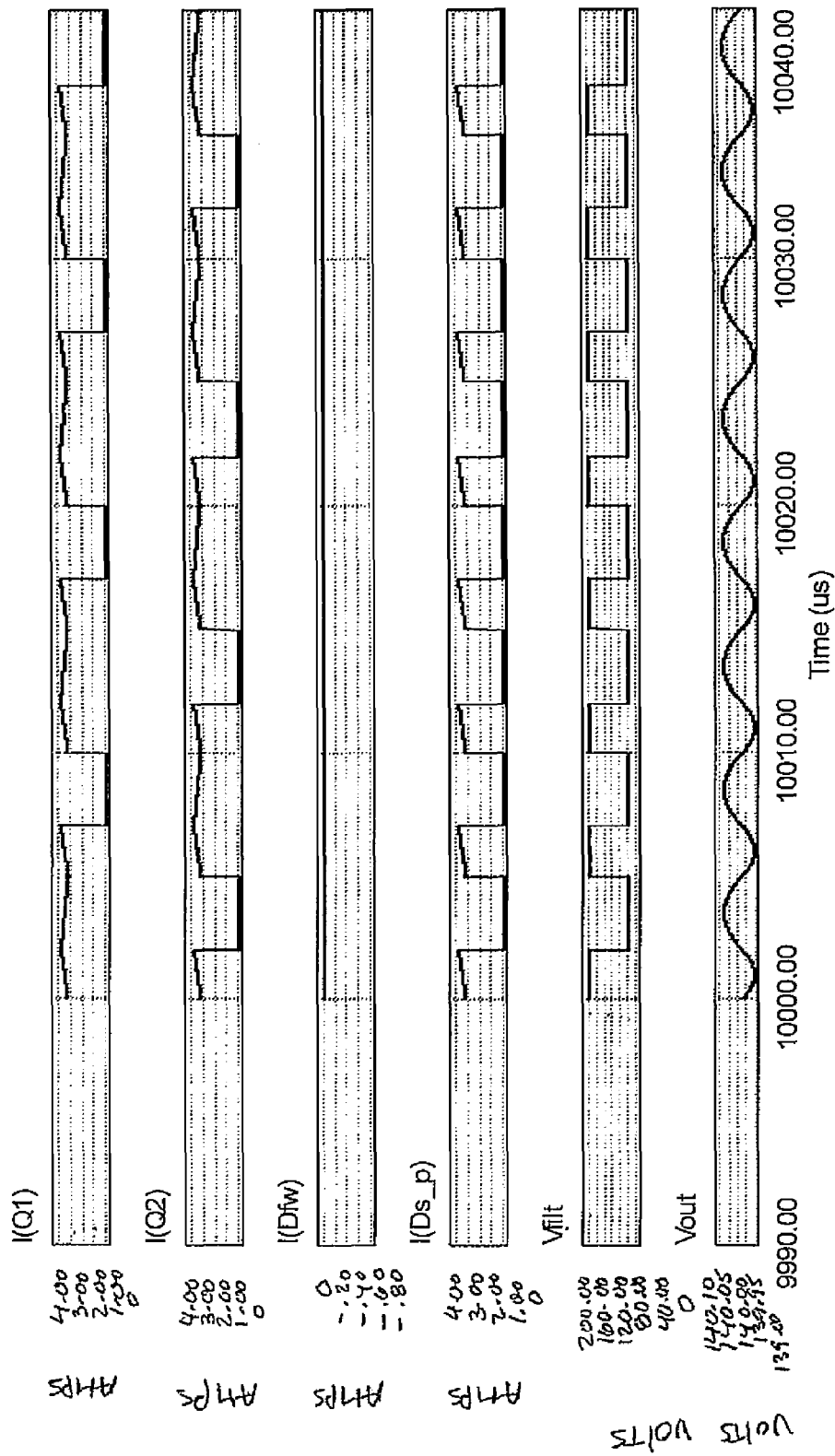
FIG. 6 is a representation of the waveforms of the circuit shown in FIG. 4 at a 70% duty cycle.

Operation of the circuit shown in FIG. 4 will now be explained in connection with FIGS. 5 and 6. FIG. 5 shows operation of the circuit of FIG. 4 at a 30% duty cycle; FIG. 6 shows operation of the circuit of FIG. 4 at a 70% duty cycle. Transistors Q1 and Q2 are switched 180° out of phase from each other and output voltage regulation is by way of pulse width modulation (PWM) of the gate drive signals (not shown).

Figure 1:
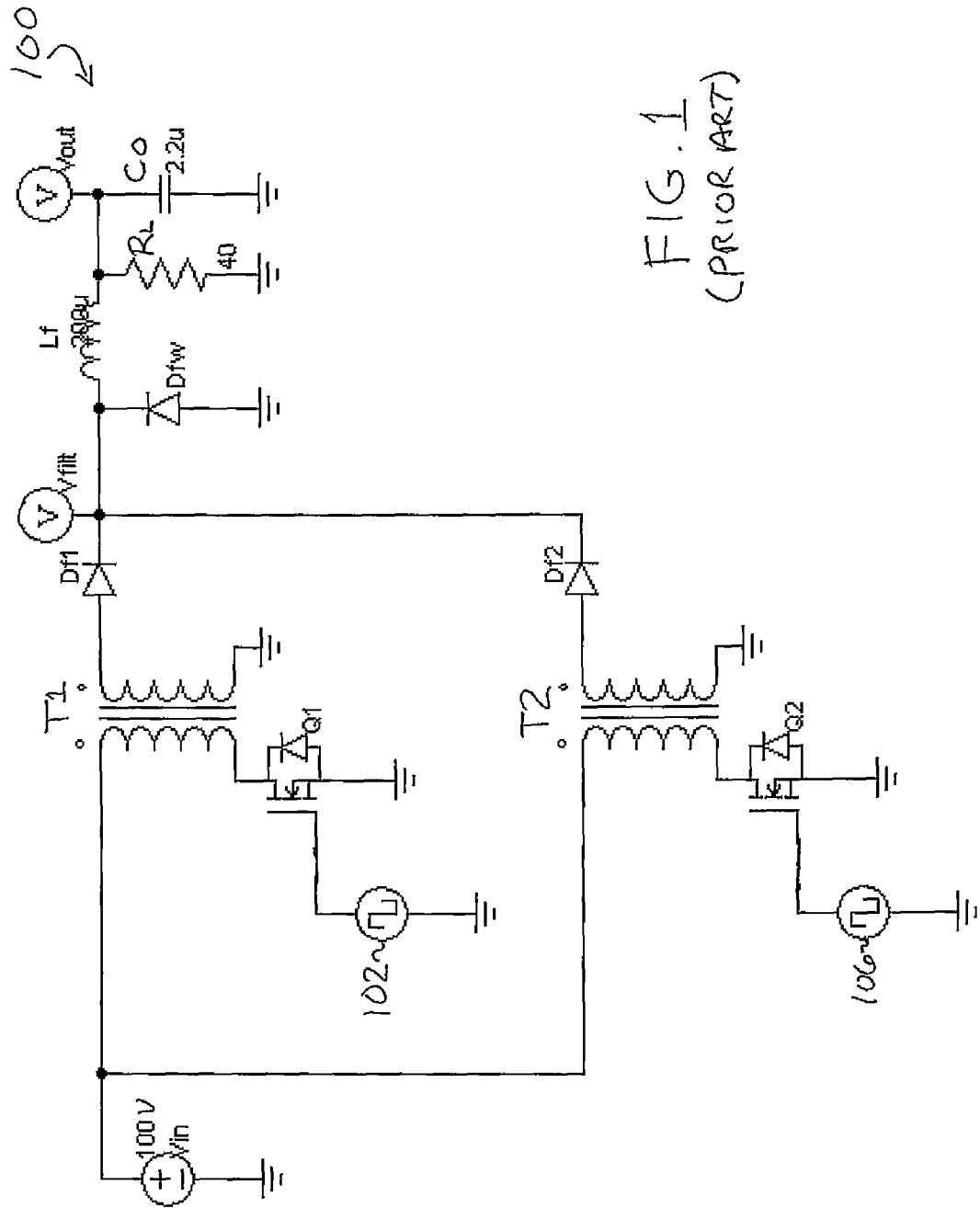
FIG. 1 is a schematic of an interleaved voltage converter known in the prior art.
Figure 2:
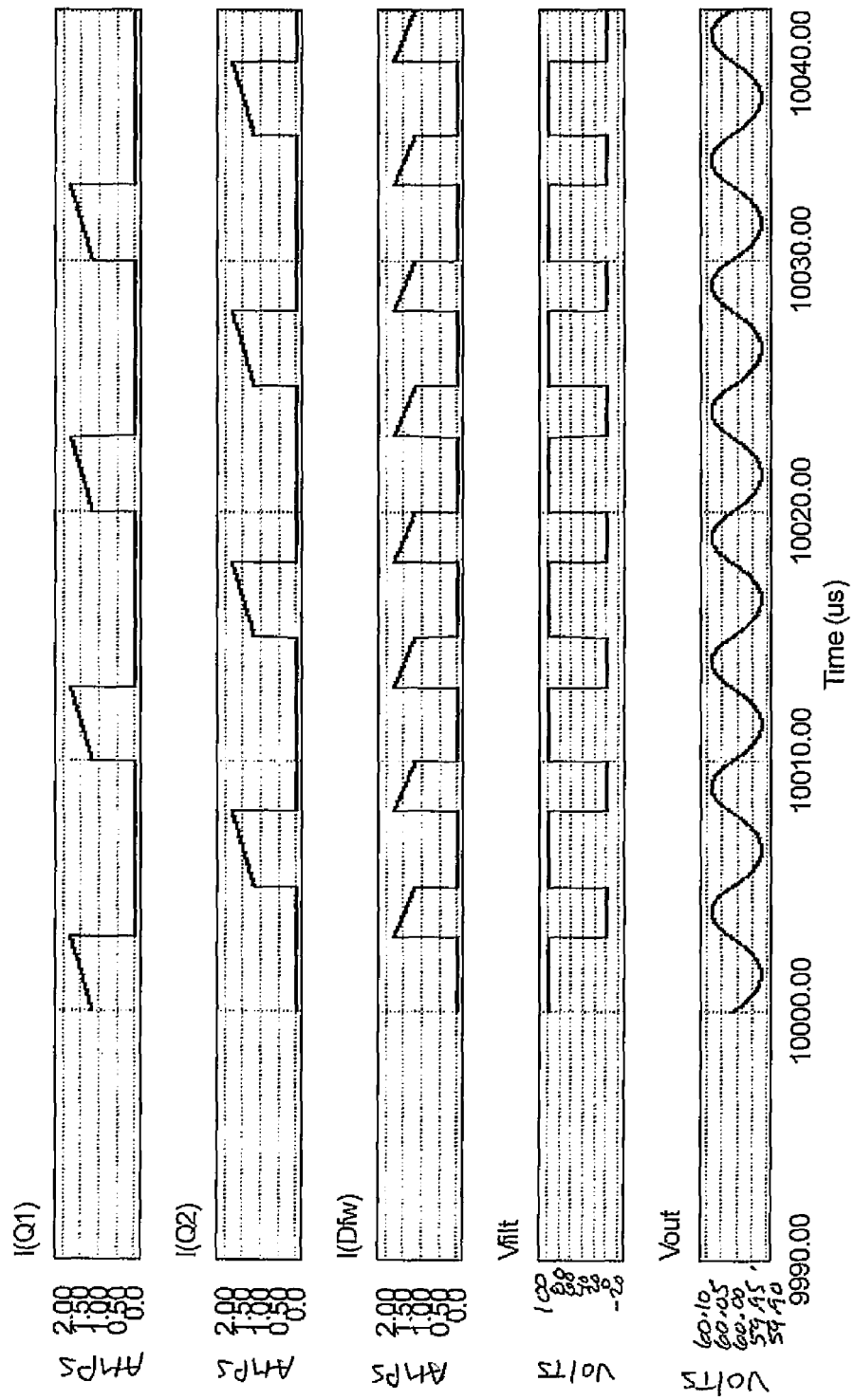
FIG. 2 is a representation of the waveforms of the circuit of FIG. 1 at a 30% duty cycle.
Figure 3:
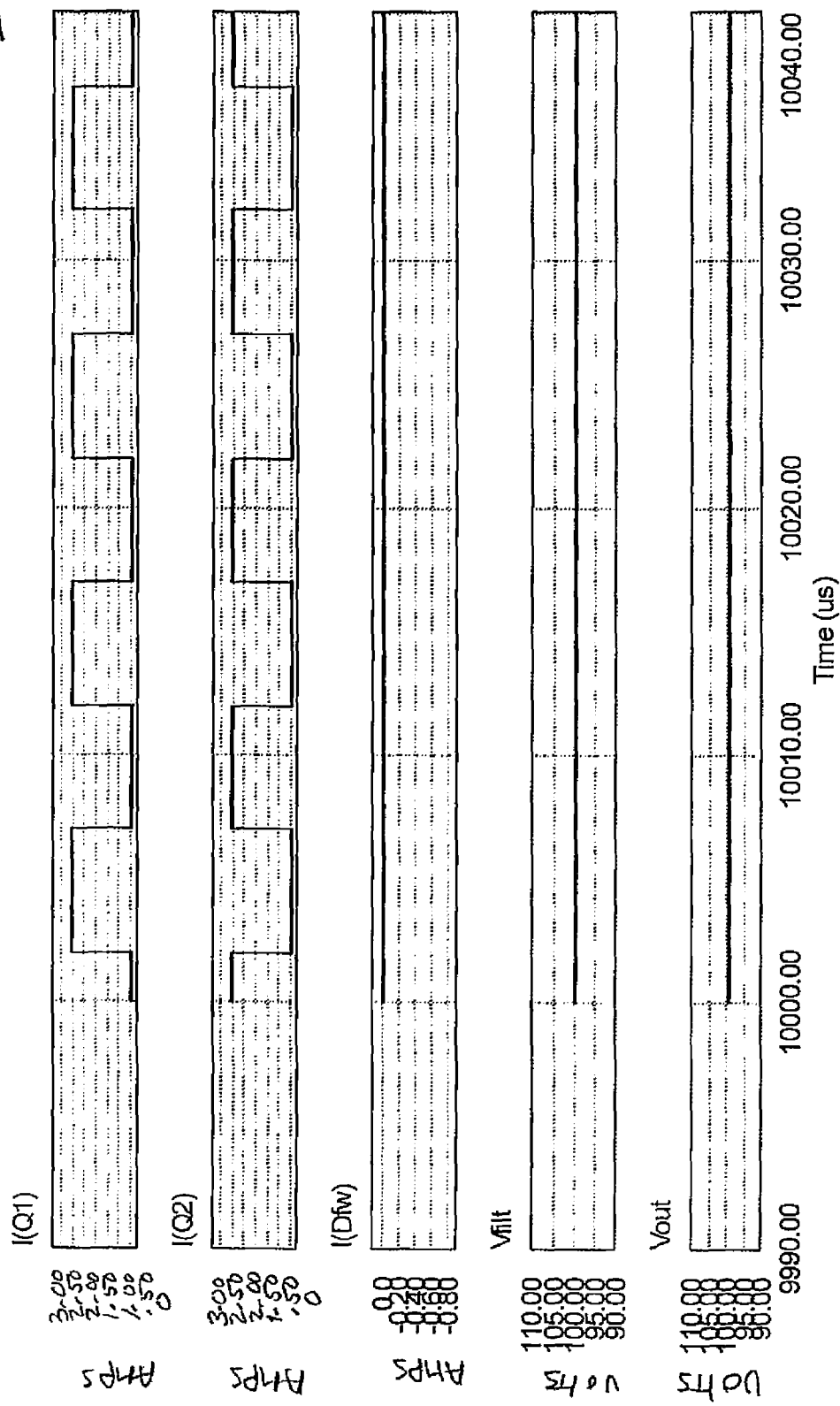
FIG. 3 is a representation of the waveforms of the circuit of FIG. 1 at a 70% duty cycle.

Comparing FIG. 5 with FIG. 2, the currents through transistors Q1 and Q2 are shown separately in FIG. 2 and are shown combined in FIG. 5. However, comparing these two figures, we see that the waveforms are identical. If we examine the current through the freewheeling diode Dfw in both figures, we see that they are identical. Similarly, the voltage Vfilt is identical in both figures as is the output voltage Vout. The diode Ds automatically places the two converters in series once the duty cycle exceeds 50%. Thus, the voltages produced by the two converters can add in series. The current through diode Ds is shown in FIG. 6 as I(Ds_p) which shows current flowing through the diode except where only one transistor is conducting. The current through the freewheeling diode DFW is the same as shown in FIG. 3 and the voltage at the node Vfilt is a rectangular wave having a positive peak when both transistors Q1 and Q2 are conducting. The output voltage to be out shows ripple as shown in FIG. 2, but the voltage at 140 V is significantly higher than the voltage of 100 V produced by the prior art circuit shown in FIG. 1 with waveforms as illustrated in FIG. 3.

Figure 7:
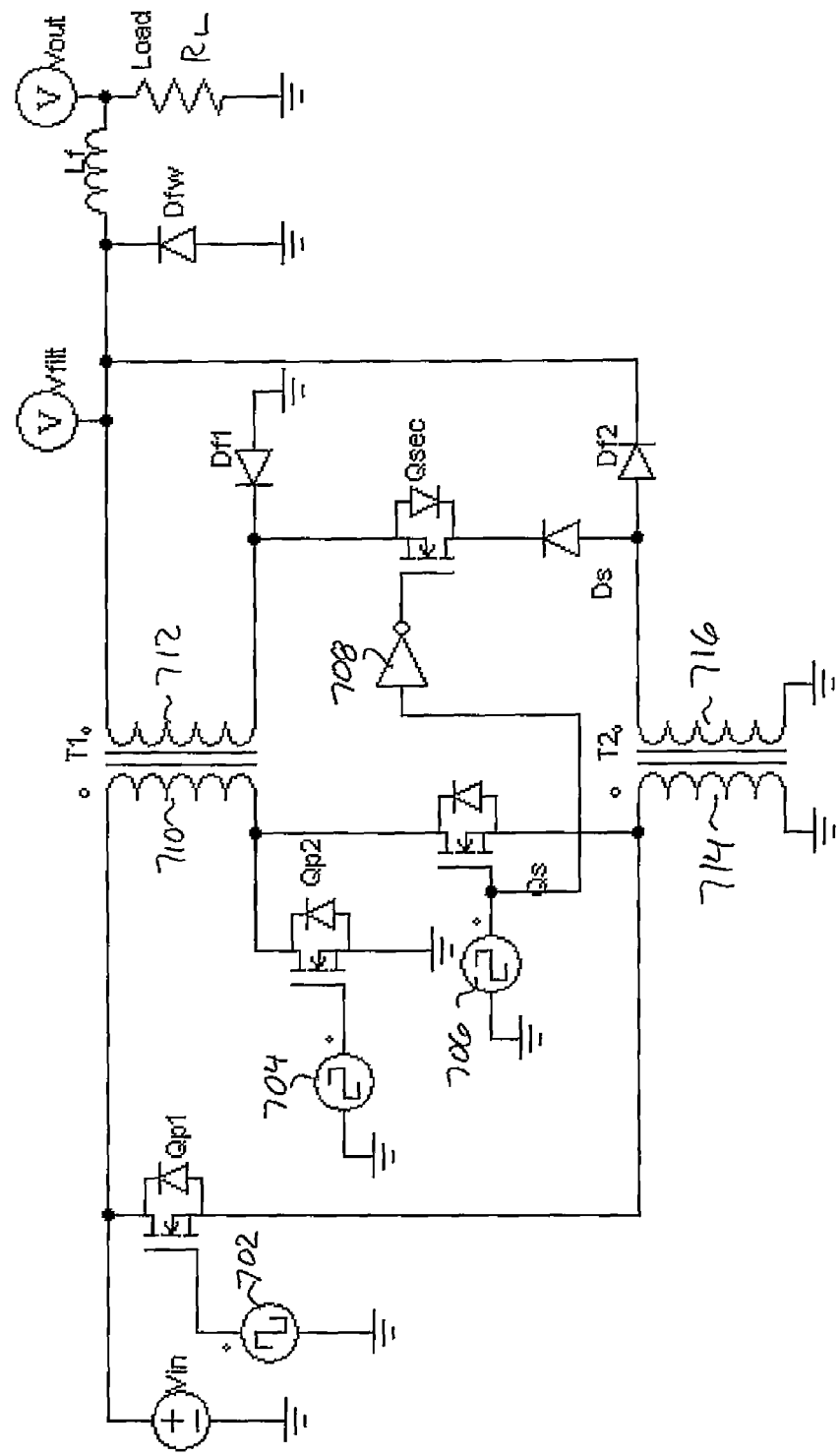
FIG. 7 is a schematic diagram of a second embodiment of the present invention.

Another aspect of the present invention is shown in FIG. 7 generally as 700. The circuit shown in FIG. 7 can operate with either a series or parallel connected input and either a series or parallel connected output in order to handle a much wider variation in input voltage. This circuit can shift from one mode of operation to another on-the-fly. The circuit 700 of FIG. 7 has a first converter comprising a first transformer T1 having a primary winding 710 which has its positive terminal connected to a source of input voltage Vin. The negative terminal of primary winding 710 is coupled to ground through transistor Qp2 and coupled to the primary winding 714 of transformer T2 of the second converter through transistor Qs. The gate of transistor Qp2 is connected to pulse generator 704 and the gate or transistor Qs is connected to pulse generator 706. The secondary winding 712 of transformer T1 has a positive terminal connected to the first terminal of filter inductor LF at node Vfilt. The negative terminal of secondary winding 712 is coupled to ground the diode Df1. The second converter comprising transformer T2 has a primary winding 714 coupled to the source of input voltage Vin via transistor Qp1. The gate of transistor Qp1 is connected to pulse generator 702. The negative terminal of 714 is connected to ground. The secondary winding 716 of the second stage has a negative terminal connected to ground and a positive terminal connected to the first terminal of filter inductor Lf through diode Df2. The positive terminal of secondary winding 716 of the second converter stage is coupled to the negative terminal of the secondary winding 712 of the first converter stage through a series connection of a diode Ds and a transistor Qsec. The gate of transistor Qsec is coupled to the gate of transistor Qs through inverter 708. A freewheeling diode Dfw is coupled between ground and the first terminal of filter inductor Lf. A load, here shown as a resistor R1 is connected to the second terminal of filter inductor Lf.

The circuit shown in FIG. 7 can handle a greater variation in input voltage. If the input voltage is lower than a threshold, then the two primary windings 710, 714 of the transformers T1 and T2 can be connected in parallel. If the input voltage is higher than a threshold, then the two primary windings 710, 714 of the transformers T1 and T2 can be connected in series. If the primary windings 710, 714 are connected in parallel, the secondary windings 712, 716 of transformers T1 and T2 can be connected in series in order to obtain a voltage boost. Conversely, if the primary windings 710, 714 are connected in series, the secondary windings 712, 716 can be connected in parallel in order to reduce the output voltage. Operation of the circuit from one mode to another can be changed on-the-fly. Therefore, there is greater flexibility in handling input voltage variations.

In order to connect the primary winding 710, 714 in parallel, the two transistors Qp1 and Qp2 are utilized. Transistors Qp1 and Qp2 are switched 180° out of phase from each other and output voltage regulation is by way of pulse width modulation (PWM) of the gate drive signals (not shown). The transistor Qs which connects the primary windings 710, 714 in series is turned off. The transistor Qsec has its gate connected to the gate of transistor Qs through inverter 708. Thus, with transistor Qs being OFF, transistor Qsec will be turned ON. Therefore, when the duty cycle exceeds 50%, the secondary windings 712, 716 will be placed in series by the action of diode Ds and transistor Qsec. By having the primary windings 710, 714 connected in parallel and the secondary windings 712, 716, connected in series, a voltage boost will be obtained thus allowing the converter to operate with a lower input voltage.

In order to connect the primary windings 710, 714 in series, transistors Qs is utilized. The output voltage is regulated by way of pulse width modulation (PWM) of the gate drive signal for transistor Qs (not shown). Transistors Qp1 and Qp2 are not utilized in this configuration. Thus it can be seen that the two windings 710, 714 are in series between the voltage source and ground. The transistor Qsec has its gate connected to the gate of transistor Qs via inverter 708. Thus, with the transistor Qs being ON, transistors Qsec will be OFF and the secondary windings 712, 716 will be in parallel through diodes Df1 and Df2. Thus, with the primary windings 710, 714 connected in series and the secondary windings 712, 716 connected in parallel, there is will be a voltage drop at the output thus allowing the regulator to operate from a higher input voltage.

Of course, both the primary windings and the secondary windings can be connected in parallel or both the primary windings and the secondary windings can be connected in series (not shown), but this does not take advantage of changing the turns ratio of the converter to produce either a voltage boost or a voltage drop as discussed above.

Figure 8:
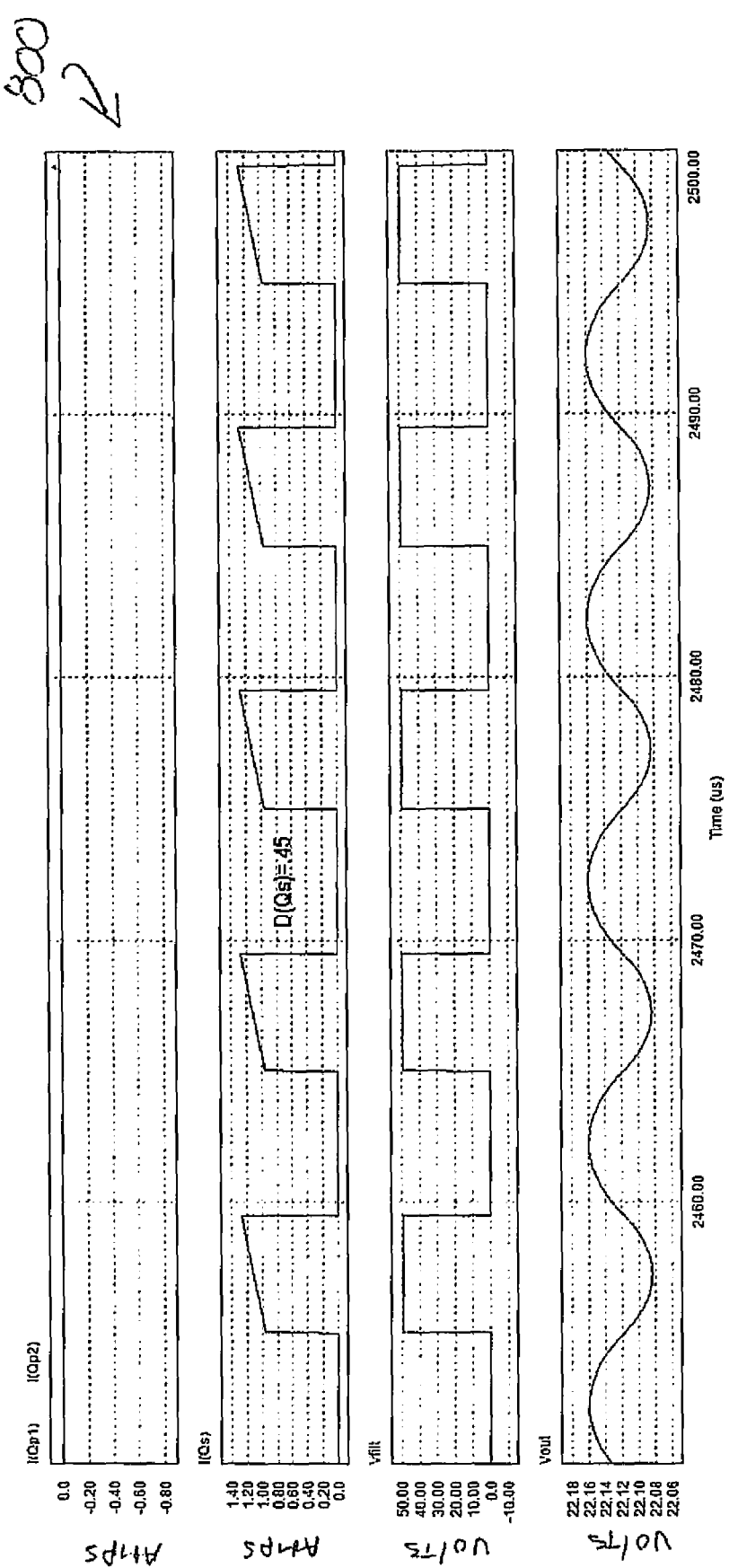
FIG. 8 is a representation of the waveforms of the circuit shown in FIG. 7.

FIG. 8 shows the waveforms for the circuit shown in FIG. 7 where Qs is active. The top graph shows the current I(Qp1) and I(Qp2) through and transistors Qp1 and Qp2 is zero, since those transistors not utilized when the primary windings are placed in series, as discussed above. The current through transistor Qs, I(Qs), is shown in the second waveform at a duty cycle of 45%. As can be seen from the bottom waveform, there is a small ripple in the output voltage Vout.

During parallel operation, transistors Qp1 and Qp2 are active with the duty cycle between zero and Dmax. Dmax is the maximum duty cycle that will allow sufficient time for demagnetization of the transformer. Transistor Qsec is ON when both Qp1 and Qp2 are ON. The circuit reduces to an interleaved forward voltage converter with a transfer ratio of: Vout=(Vin/N)·2·D, where D is greater than zero and less than Dmax.

During series operation transistor Qs has a duty cycle between zero and Dmax, and transistors Qp1 and Qp2 are OFF. The circuit reduces to a single forward converter with a DC transfer ratio of: Vout=(Vin/N)·D where D is between zero and Dmax.

Although the invention has been described in detail, it should be understood that various changes, substitutions and alterations can be made thereto without departing from the spirit and scope of the invention as defined by the appended claims.

The invention claimed is:

1. An interleaved forward voltage converter comprising:
   a first converter stage comprising a first transformer having a turns ratio N having a primary winding having one terminal coupled to a source of input voltage and another terminal coupled to a first switching transistor and a second switching transistor;
   a first secondary winding for the first transformer having a first terminal coupled to a first terminal of a filter inductor and a second terminal coupled to a first diode and a third switching transistor;
   a second converter stage comprising a second transformer having a turns ratio N and having a primary winding having one terminal coupled to the source of input voltage and another terminal coupled to a reference voltage source;
   a second secondary winding for the second transformer having a first terminal coupled to the first terminal of the filter inductor to a second diode and a second terminal coupled to the reference voltage source;
   wherein the third switching transistor being coupled between the second terminal of the first secondary winding of the first transformer and the first terminal of the second secondary winding of the second transformer; and
   further comprising a third diode coupled in series with the third switching transistor.

2. The interleaved forward of claim 1 further comprising a freewheeling diode coupled between the first terminal of the filter inductor and the reference voltage source.

3. The interleaved voltage converter of claim 1 further comprising a fourth switching transistor coupled between the source of input voltage and the one input terminal of the second primary winding.

4. A method of operating an interleaved forward voltage converter so as to provide a series or parallel connection between the converters comprising:
   providing two transformers each having a primary winding having a positive terminal coupled to a source of voltage and each having a secondary winding having a positive terminal coupled to one terminal of a filter inductor;
   providing parallel operation of the primary windings by driving a first pair of transistors 180° out of phase with each other, one transistor being in series with a positive terminal of a first primary winding and other transistor being in series with the negative terminal of a second primary winding;
   alternatively providing series operation of the primary windings by driving a third transistor coupled between a negative terminal of the first primary winding and the positive terminal of the second primary winding;
   providing parallel operation of the secondary windings by coupling a negative terminal of the first secondary winding to a reference potential through a first diode and coupling a positive terminal of the second secondary winding to the first terminal of the filter inductor through a second diode;

alternatively providing series operation of the secondary windings by driving a fourth transistor between a negative terminal of the first secondary winding in the positive terminal of the second secondary winding.

5. The method of claim 4 further comprising providing a diode series with the fourth transistor.

6. The method of claim 4 wherein the first pair of transistors is operated when the source of voltage is lower than a predetermined threshold.

7. The method of claim 4 wherein the third transistor operated when the source of input voltage is higher than a predetermined threshold.

8. The method of claim 6 wherein the fourth transistor is operated to increase in output voltage of the converter.

9. The method of claim 7 wherein the two secondary windings are connected in parallel.

* * * * *